March 2, 1971  M. SHARENOW ET AL  3,567,812

STREAMLINE BALLOON FABRICATION

Filed July 8, 1969

INVENTORS
MOSES SHARENOW
ERIC NELSON
BY Milton M. Davis
Harry M. Saragovitz
Edward J. Kelly
Herbert Berl
ATTORNEYS

United States Patent Office 3,567,812
Patented Mar. 2, 1971

3,567,812
STREAMLINE BALLOON FABRICATION
Moses Sharenow, Asbury Park, and Eric Nelson, Fort Lee, N.J., assignors to the United States of America as represented by the Secretary of the Army
Filed July 8, 1969, Ser. No. 839,827
Int. Cl. B29c 13/04; B29h 3/02
U.S. Cl. 264—100                                                                                       2 Claims

ABSTRACT OF THE DISCLOSURE

A method of fabricating a streamline balloon that comprises forming a first balloon and laying a partial nonadhering surface thereon. A second balloon is formed on part of the adhering surface of the first balloon. Both balloons are inflated, then deflated and cured. One of the balloons is turned inside-out to provide a tail for desired streamline effect.

---

The invention described herein may be manufactured, used and licensed by or for the Government for governmental purposes without the payment to us of any royalty thereon.

BACKGROUND OF THE INVENTION

In the manufacture of meteorological balloons a prime objective sought by manufacturers of such balloons is to effectively reduce the weight thereof to reduce the inflation volume.

Fast rising balloons have been used by the armed services to report weather conditions aloft in the field and elsewhere. Such balloons have been spherical in shape and require a hydrogen volume of more than 300 cubic feet. The spherical shape of earlier balloons leads to a considerable high drag coefficient due to the air turbulence and consequent partial vacuum built up in the area just below the balloon as it ascends.

It has been proposed to overcome this difficulty by employing a streamlined balloon whereby the drag coefficient would be reduced and a smaller volume of gas would be required to inflate the balloon. A single body streamlined balloon has not been completely satisfactory in that the center of buoyancy is so low as to cause instability as the balloon ascends, thereby increasing the effective drag coefficient. It has therefore been proposed that a spherical balloon be provided with a tapered uninflated or slightly inflated tail. A balloon of such structure produced good stability in that the center of buoyancy of the entire structure would be high. Various techniques and methods of fabrication have been suggested for making such meteorological ballons. One method has been proposed in U.S. Pat. 2,790,479 to Mastenbrook wherein two preformed balloons are coated on part of their surface with adhesive and adhered together. A small circular area within the adhered band is cut away from the lower balloon which thus forms a skirt for the upper balloon. Another method of fabricating balloons of the same general type is described in U.S. Pat. 2,929,110 to Nickerson et al. wherein there is described a method of producing gel-adhered streamlined balloons which comprises essentially the steps of forming identical wet gel structures having a partial coating of natural rubber on each, drying the balloons until only the natural rubber gel coat remains tacky and pressing the natural rubber gel surface against each other to produce a joint composite therebetween and curing the joined structures. It is thus apparent, by the method described in the Nickerson et al. patent, there is produced a streamlined balloon in which the joint composite junction is formed of two thicknesses of rubber or like material. Such joint composite junction obviously adds to the overall weight of the balloon.

Still another method of fabricating a streamline balloon is shown in Pat. 3,140,969 to Sharenow. In this patent, a method is shown that includes the steps of first preparing two separate balloons, masking out a portion of one of the balloons while in wet gel state and forcing the second balloon into engagement with the partially masked balloon to allow partial adherence thereto. Such method involved the use of frameworks to support the separate balloons, was time consuming and expensive to fabricate.

SUMMARY OF THE INVENTION

In each and all of the techniques heretofore described certain fabrication difficulties have arisen which are believed overcome by the invention of this application. The present invention has advantage over the cementing means in that the surface between the balloon and its tail is completely smooth with no possibility of existence of objectionable air bubbles.

The present invention allows for precise positioning of the tail onto the ballon since the dipping depth into the talc coagulant solution can be accurately controlled. In the cementing and gel-adhered methods such is not possible since the balloons used can move during such assembly operation.

Both the gel-adhered and cementing processes require additional equipments such as bulky rigs to support the balloons during their assembly.

In accordance with the invention herein there is provided a method of fabricating a streamline balloon that includes the steps of forming a first balloon by inserting a dipping form into a latex solution and then immersed into a solution of talc and coagulant to a predetermined level to form a nonadhering surface thereon. The balloon is again dipped into the latex solution to a level about 2 inches above the nonadhering portion whereby the second latex application adheres only to the 2 inch portion to form a second balloon that partially encompasses the first balloon. Both balloons, as a unit, are stripped from the dipping form and the botton necks clipped to allow for wet gel inflation. Both balloons are inflated, then deflated and cured. One of the balloons is turned inside out providing a long tail piece for the resulting unitary structure.

BRIEF DESCRIPTION OF THE DRAWINGS

The exact nature of this invention will be readily apparent from consideration of the following specification in view of the annexed drawing in which.

DESCRIPTION OF THE PREFERRED EMBODIMENT

Figure 1:
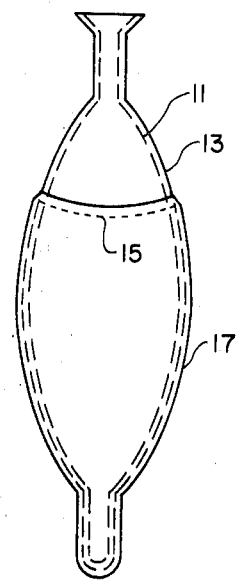
FIGS. 1, 2 and 3 portray the successive stages respectively of the fabrication steps of making a streamline balloon in accordance with the present invention.

In FIG. 1 there is shown the means for preparing two balloons that eventually make up the preferred streamline balloon. A conventional dipping form or mold shown at 11 is dipped to its full depth into a latex, or other appropriate solution to make the first one coat balloon designated at 13. The dipping form is then removed from the latex solution and shortly thereafter is immersed into a solution of talc and coagulant to a depth of about two-thirds the length of the dipping form 11 and the balloon 13 to a location such as shown by the dotted line 15. The dipping form 11 is then withdrawn from the talc coagulant solution. The talc coagulant solution utilized is one that comprises substantially 10% fine particle size talc and 90% coagulant. Such materials are readily available on the commercial market and no preference is made in the use of specific available commercial brands.

The dipping form 11 is then again immersed into the latex solution to a position about 2 inches above the coagulant line, i.e. about 2 inches above the line 15. It is apparent that the second dipping will not adhere to that portion of the balloon 13 covered with the talc coagulant solution, but will adhere only in the 2 inch band above the line 15 to form a second balloon 17. Both balloons 13 and 17 are stripped from the dipping form 11 and the bottom necks of both are snipped to allow for wet gel inflation.

Figure 2:
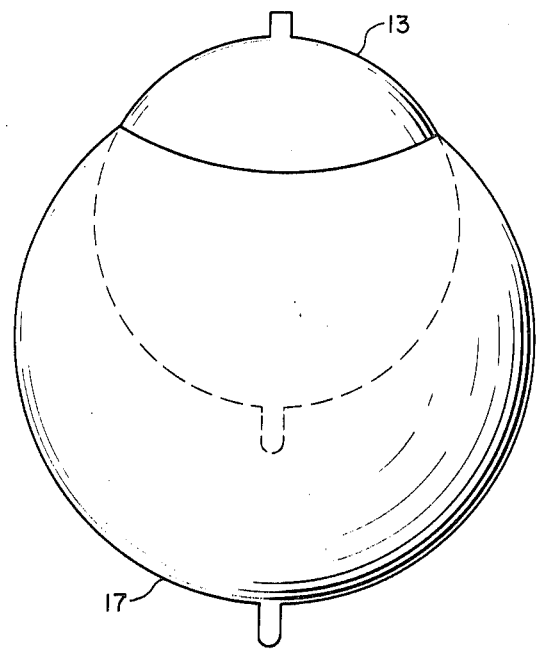

FIG. 2 shows the succeeding stage wherein both balloons have been air inflated. The balloons are subsequently deflated and cured in conventional manner.

Figure 3:
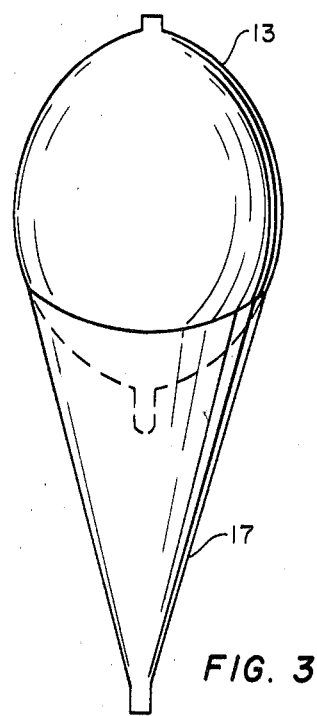

FIG. 3 shows the completed assembly wherein balloon 17, which is to be the tail portion, is turned inside out providing a tail portion that hangs from below the equator portion of balloon 13 to provide the much desired longer tail.

We wish it to be understood that we do not desire to be limited to the exact details of construction shown and described, for obvious modifications will occur to a person skilled in the art.

What is claimed is:

1. A method of fabricating a streamline balloon comprising the steps of:
   (a) forming a first balloon with a neck portion by immersing a dipping form into a latex solution
   (b) immersing said dipping form and first balloon into a solution of talc and coagulant to form a nonadhering surface on a partial portion of the first balloon;
   (c) again dipping the first balloon into a latex solution to a level slightly above the nonadhering portion to form a second balloon including a neck portion, said second balloon partially encompassing said first balloon;
   (d) stripping both of said balloons from the dipping form;
   (e) clipping the neck portions of both balloons to allow for inflation;
   (f) inflating, deflating and curing said balloons; and
   (g) turning one of said balloons inside out to provide a tail piece for the other balloon.

2. The method of claim 1 wherein said talc and coagulant solution comprises essentially 10% talc and 90% coagulant.

References Cited

UNITED STATES PATENTS

| | | | |
|---|---|---|---|
| 2,043,630 | 6/1936 | Raiche | 264—264 |
| 2,241,385 | 5/1941 | Beal | 264—264X |
| 2,248,934 | 7/1941 | Auzin | 264—264 |
| 2,790,479 | 4/1957 | Mastenbrook | 241—31X |
| 2,929,110 | 3/1960 | Nickerson et al. | 264—100 |
| 3,140,969 | 7/1964 | Sharenow | 264—100X |

ROBERT F. WHITE, Primary Examiner

T. J. CARVIS, Assistant Examiner

U.S. Cl. X.R.

244—31; 264—255, 263